(12) United States Patent
Davis

(10) Patent No.: US 6,406,080 B1
(45) Date of Patent: Jun. 18, 2002

(54) VEHICLE DOOR AND FENDER PROTECTION ASSEMBLY

(76) Inventor: Barry E. Davis, 10 Byron Road, Hutton Brentwood Essex CM13 2RU (GB)

(*) Notice: Subject to any disclaimer, the term of this patent is extended or adjusted under 35 U.S.C. 154(b) by 0 days.

(21) Appl. No.: 09/797,663

(22) Filed: Mar. 5, 2001

(51) Int. Cl.[7] ............................................. B60R 19/42
(52) U.S. Cl. ........................ 293/128; 293/DIG. 6; 296/136
(58) Field of Search ............................ 293/128, 126, 293/DIG. 6; 296/136

(56) References Cited

U.S. PATENT DOCUMENTS

| | | | | |
|---|---|---|---|---|
| 3,659,887 A | * | 5/1972 | Marquette | 293/128 |
| 4,493,502 A | * | 1/1985 | Campbell, Jr. | 293/128 |
| 4,561,685 A | * | 12/1985 | Fischer | 293/128 |
| 4,643,471 A | * | 2/1987 | Fishback | 293/128 |
| 4,708,380 A | | 11/1987 | Cruz | |
| 4,810,015 A | * | 3/1989 | McNeil | 293/128 |
| 4,828,303 A | * | 5/1989 | Soria | 293/128 |
| D308,848 S | | 6/1990 | Genicoff | |
| 5,112,092 A | | 5/1992 | Pucci | |
| 5,129,695 A | | 7/1992 | Norman, II | |
| 5,149,166 A | | 9/1992 | Willie et al. | |
| 5,165,584 A | * | 11/1992 | Meagher et al. | 224/258 |
| 5,312,145 A | * | 5/1994 | McNeil | 293/128 |
| 5,320,392 A | * | 6/1994 | Hart | 293/128 |
| 5,928,275 A | * | 7/1999 | Yates et al. | 607/112 |
| 5,956,918 A | | 9/1999 | Wise | |
| 6,030,085 A | * | 2/2000 | Leam et al. | 258/871 |
| 6,179,354 B1 | * | 1/2001 | Bennett, Jr. | 293/128 |

* cited by examiner

Primary Examiner—Stephen T. Gordon
Assistant Examiner—Lori L Coletta

(57) ABSTRACT

A vehicle door and fender protection assembly for preventing vehicle doors and fenders from being nicked, scratched, and dented. The vehicle door and fender protection assembly includes padded members being adapted to attach to doors and fenders of a vehicle; and also includes shell members being adapted to cover the padded members; and further includes a vehicle attachment assembly for attaching the padded members and the shell members to the vehicle.

13 Claims, 9 Drawing Sheets

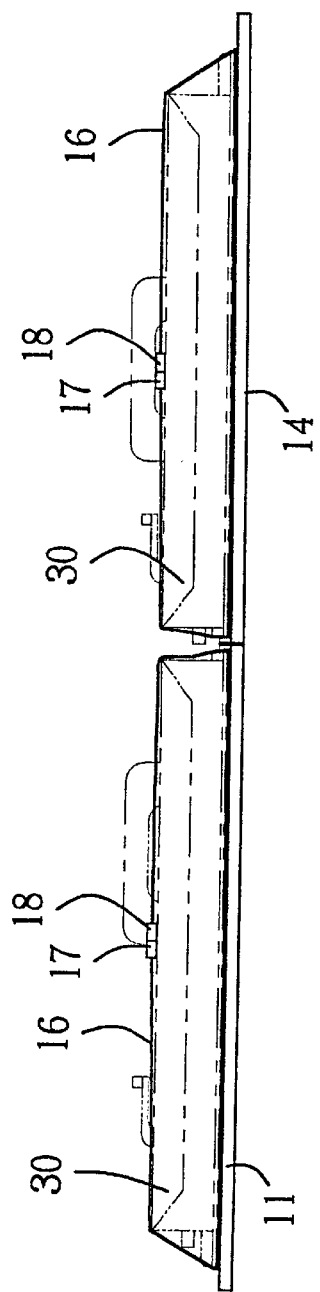
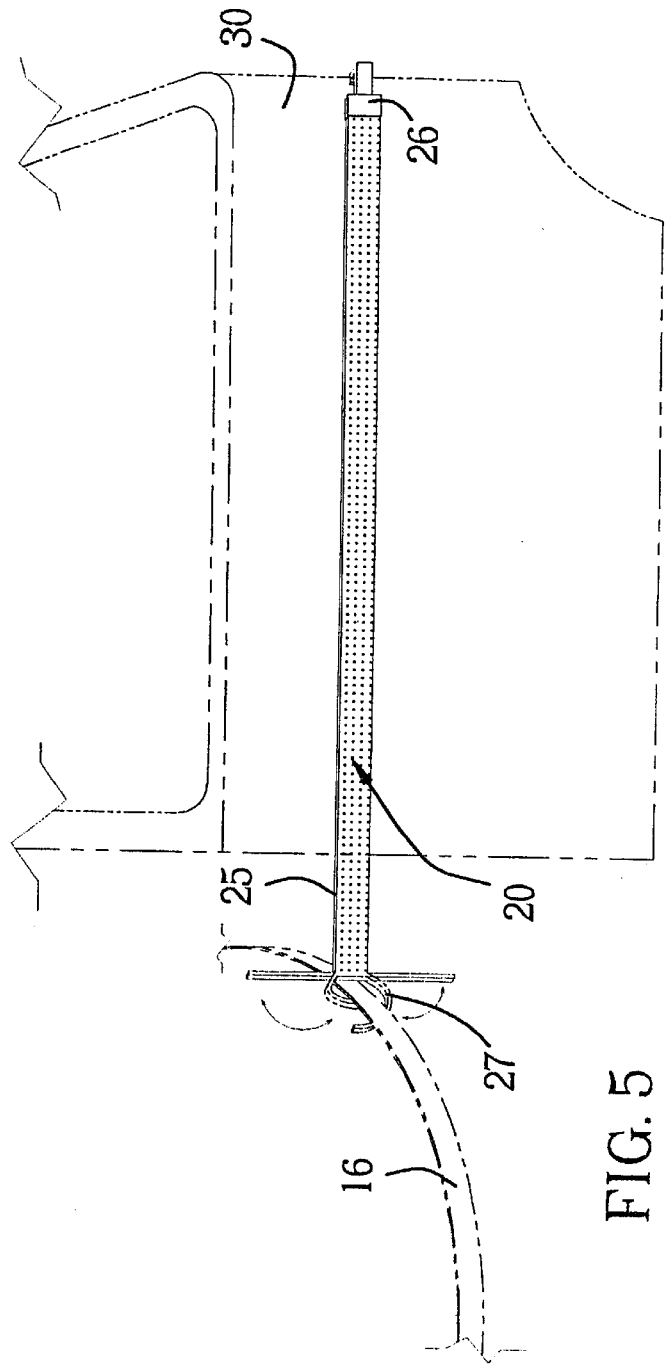

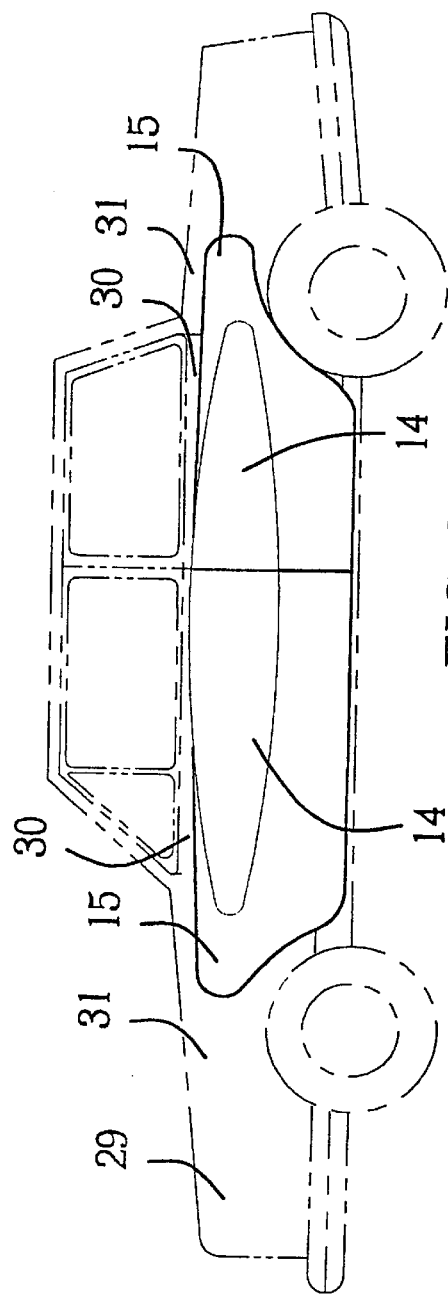
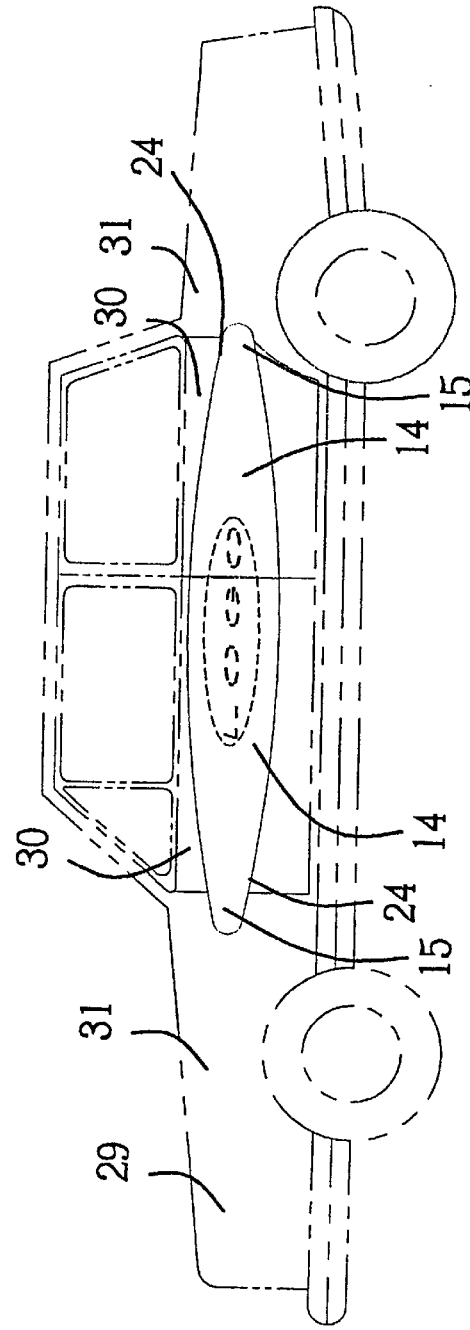

VEHICLE DOOR AND FENDER PROTECTION ASSEMBLY

BACKGROUND OF THE INVENTION

1. Field of the Invention

The present invention relates to bumpers for doors and fenders for vehicles and more particularly pertains to a new vehicle door and fender protection assembly for preventing vehicle doors and fenders from being nicked, scratched, and dented.

2. Description of the Prior Art

The use of bumpers for doors and fenders for vehicles is known in the prior art. More specifically, bumpers for doors and fenders for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,708,380; 5,129,695; 5,956,918; 5,112,092; 5,149,166; and U.S. Pat. No. Des. 308,848.

While these devices fulfill their respective, particular objectives and requirements, the aforementioned patents do not disclose a new vehicle door and fender protection assembly. The inventive device includes padded members being adapted to attach to doors and fenders of a vehicle; and also includes shell members being adapted to cover the padded members; and further includes a vehicle attachment assembly for attaching the padded members and the shell members to the vehicle.

In these respects, the vehicle door and fender protection assembly according to the present invention substantially departs from the conventional concepts and designs of the prior art, and in so doing provides an apparatus primarily developed for the purpose of preventing vehicle doors and fenders from being nicked, scratched, and dented.

SUMMARY OF THE INVENTION

In view of the foregoing disadvantages inherent in the known types of bumpers for doors and fenders for vehicles now present in the prior art, the present invention provides a new vehicle door and fender protection assembly construction wherein the same can be utilized for preventing vehicle doors and fenders from being nicked, scratched, and dented.

The general purpose of the present invention, which will be described subsequently in greater detail, is to provide a new vehicle door and fender protection assembly apparatus and method which has many of the advantages of the bumpers for doors and fenders for vehicles mentioned heretofore and many novel features that result in a new vehicle door and fender protection assembly which is not anticipated, rendered obvious, suggested, or even implied by any of the prior art bumpers for doors and fender s for vehicles, either alone or in any combination thereof.

To attain this, the present invention generally comprises padded members being adapted to attach to doors and fenders of a vehicle; and also includes shell members being adapted to cover the padded members; and further includes a vehicle attachment assembly for attaching the padded members and the shell members to the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle door and fender protection assembly apparatus and method which has many of the advantages of the bumpers for doors and fenders for vehicles mentioned heretofore and many novel features that result in a new vehicle door and fender protection assembly which is not anticipated, rendered obvious, suggested, or even implied by any of the prior art bumpers for doors and fenders for vehicles, either alone or in any combination thereof.

It is another object of the present invention to provide a new vehicle door and fender protection assembly which may be easily and efficiently manufactured and marketed.

It is a further object of the present invention to provide a new vehicle door and fender protection assembly which is of a durable and reliable construction.

An even further object of the present invention is to provide a new vehicle door and fender protection assembly which is susceptible of a low cost of manufacture with regard to both materials and labor, and which accordingly is then susceptible of low prices of sale to the consuming public, thereby making such vehicle door and fender protection assembly economically available to the buying public.

Still yet another object of the present invention is to provide a new vehicle door and fender protection assembly which provides in the apparatuses and methods of the prior art some of the advantages thereof, while simultaneously overcoming some of the disadvantages normally associated therewith.

Still another object of the present invention is to provide a new vehicle door and fender protection assembly for preventing vehicle doors and fenders from being nicked, scratched, and dented.

Yet another object of the present invention is to provide a new vehicle door and fender protection assembly which includes padded members being adapted to attach to doors and fenders of a vehicle and also includes shell members being adapted to cover the padded members; and further includes a vehicle attachment assembly for attaching the padded members and the shell members to the vehicle.

Still yet another object of the present invention is to provide a new vehicle door and fender protection assembly that intercepts objects such as doors of other vehicles and carts from damaging the doors and fenders of one's vehicle.

Even still another object of the present invention is to provide a new vehicle door and fender protection assembly that can be easily and quickly attached to the doors and fenders of one's vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top plan view of the present invention mounted to a vehicle.

FIG. 5 is a side elevational view of the belt of the present invention mounted to a vehicle.

FIG. 6 is a side elevational view of a second embodiment of the present invention.

FIG. 9 is another side elevational view of the present invention mounted to a vehicle.

DESCRIPTION OF THE PREFERRED EMBODIMENT

Figure 1:
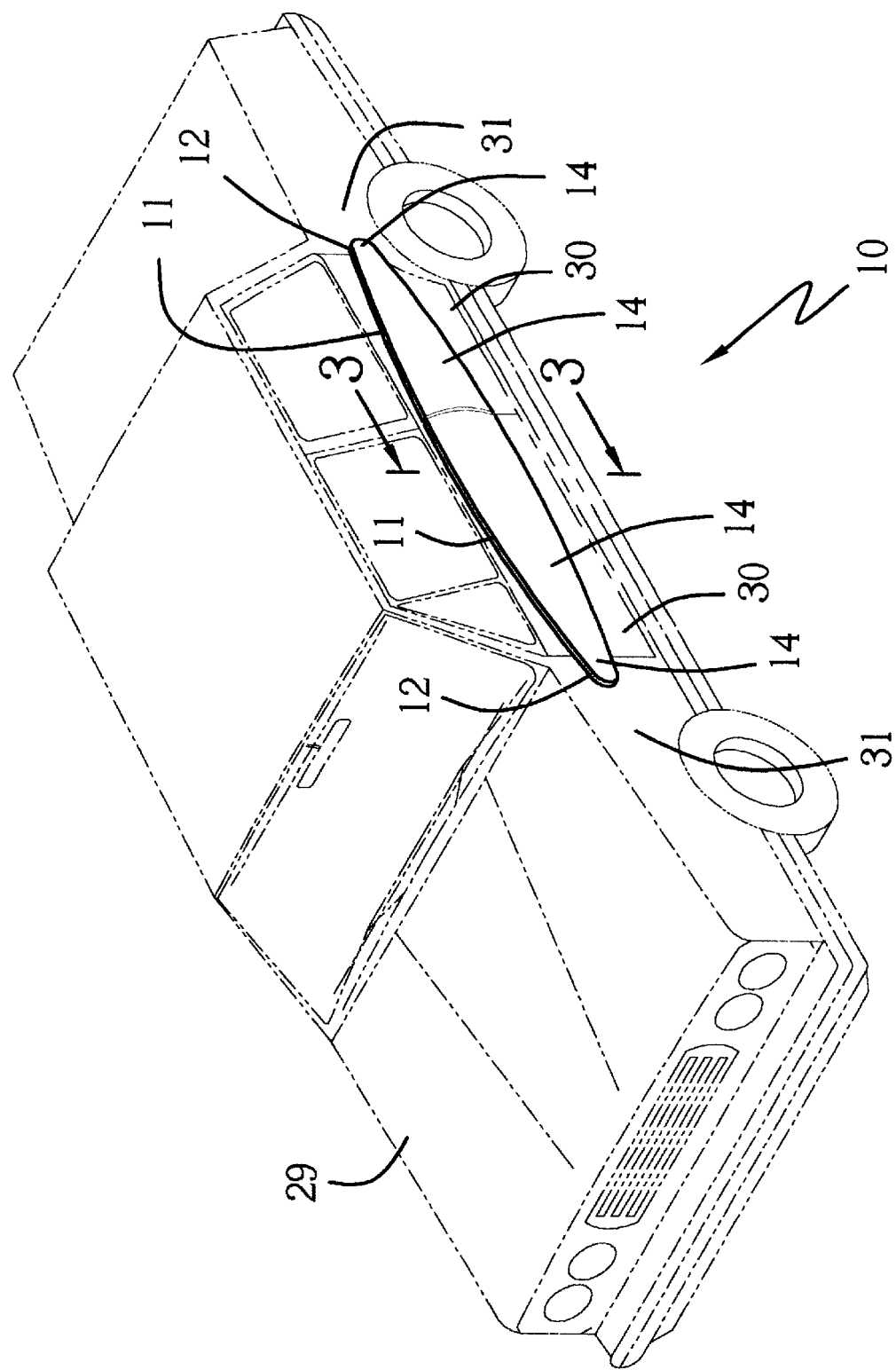
FIG. 1 is a perspective view of a new vehicle door and fender protection assembly according to the present invention and shown mounted to a vehicle.
Figure 3:
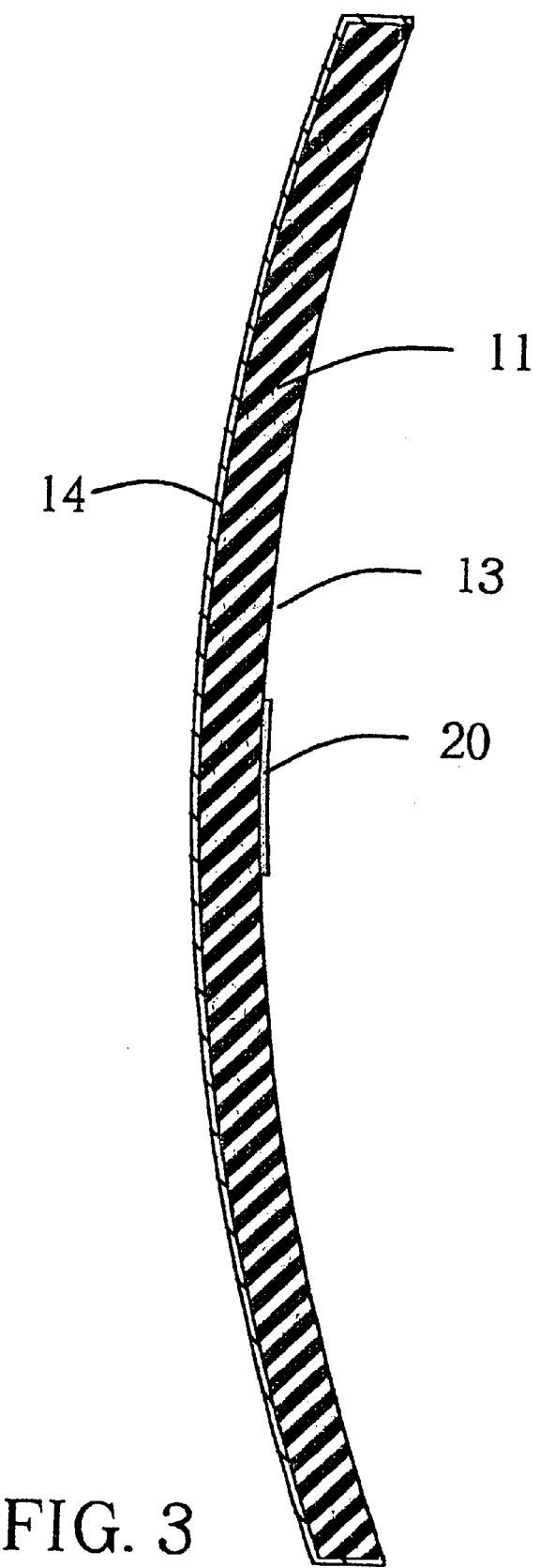
FIG. 3 is a cross-sectional view of the present invention.
Figure 4:
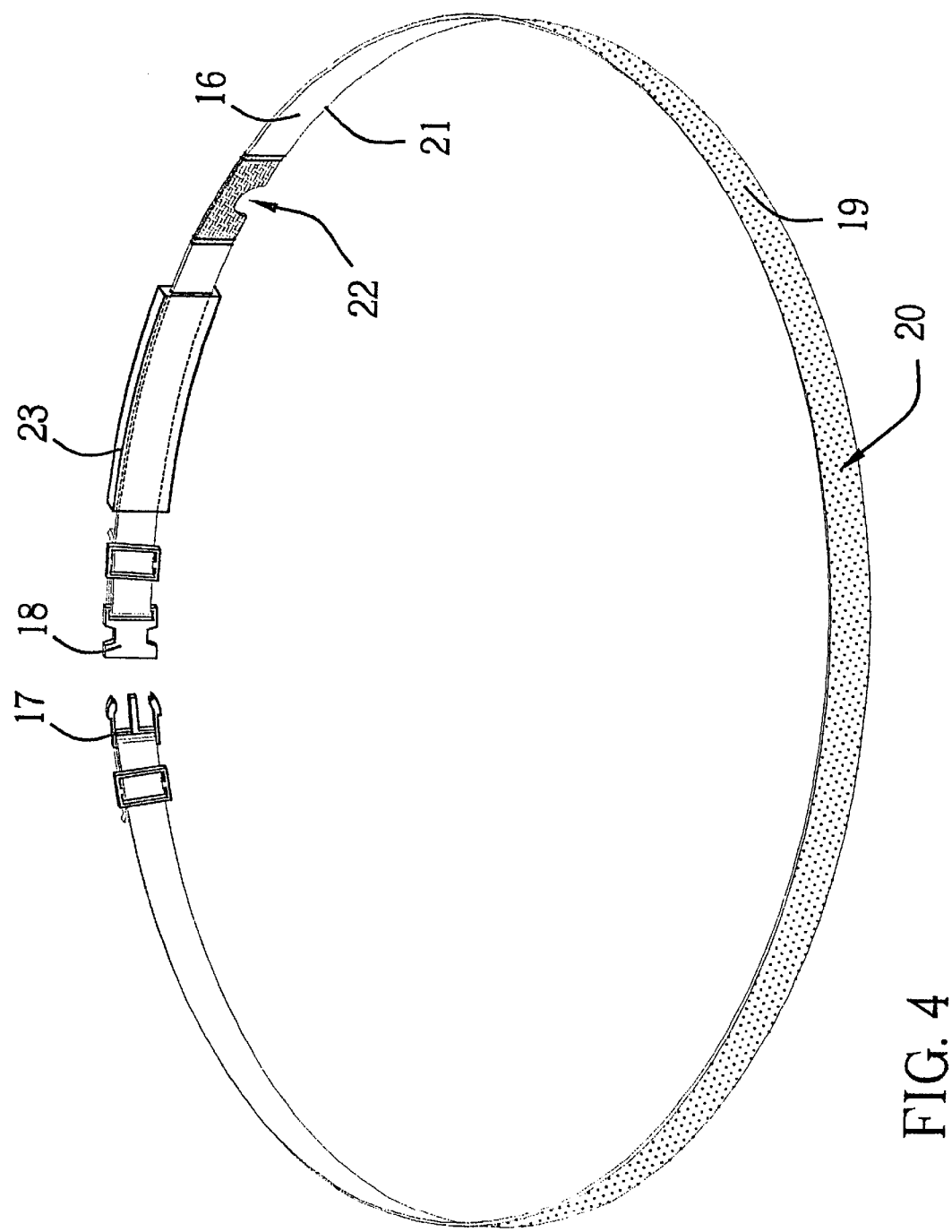
FIG. 4 is a perspective view of a belt of the present invention.
Figure 7:
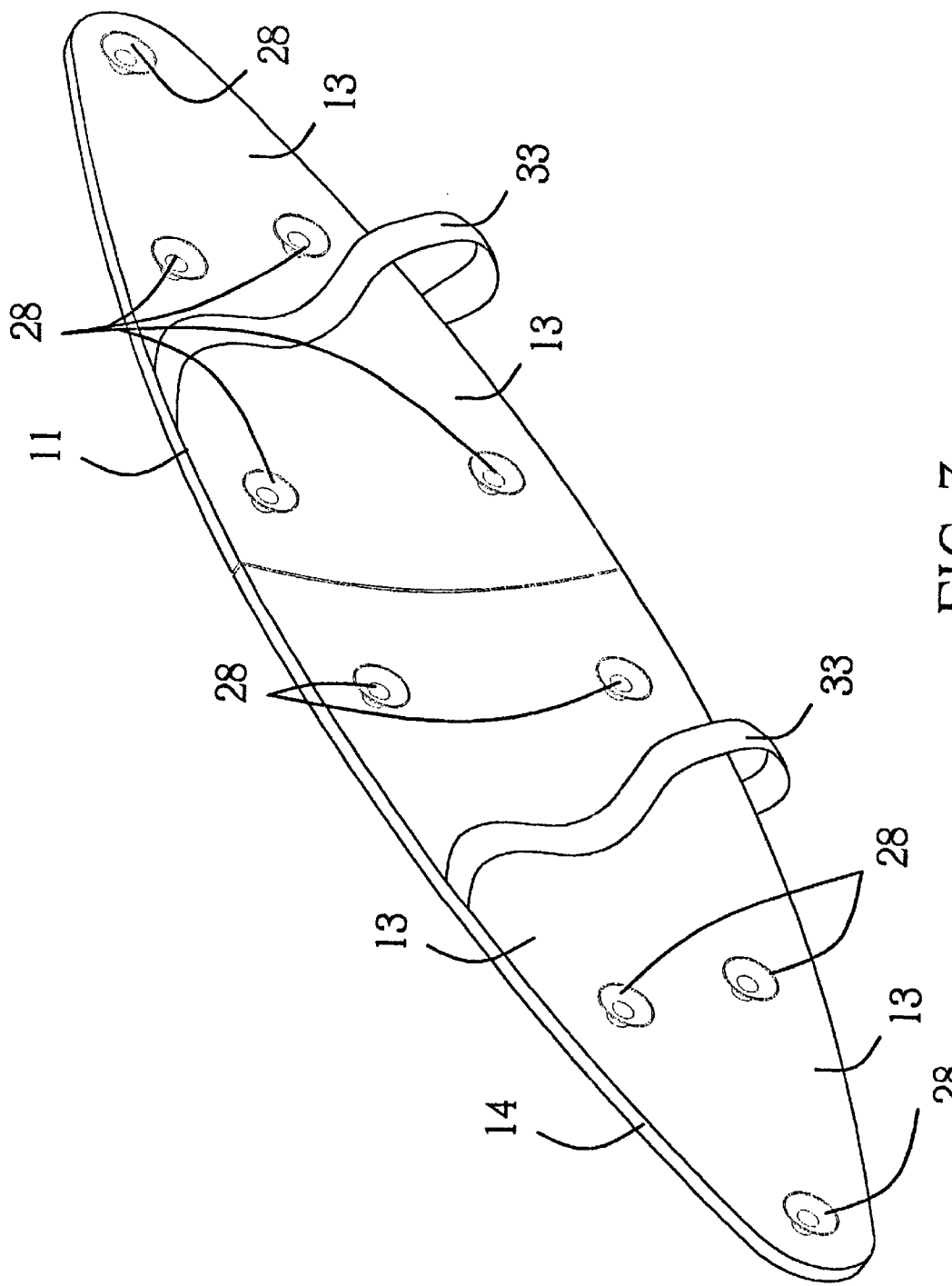
FIG. 7 is perspective view of a third embodiment of the present invention.

With reference now to the drawings, and in particular to FIGS. 1 through 11 thereof, a new vehicle door and fender protection assembly embodying the principles and concepts of the present invention and generally designated by the reference numeral 10 will be described.

As best illustrated in FIGS. 1 through 11, the vehicle door and fender protection assembly 10 generally comprises padded members 11, 12 being adapted to attach to doors 30 and fenders 31 of a vehicle 29. The padded members 11, 12 include door padded members 11 and fender padded members 12 which have ends which are removably attached to ends of the door padded members 11. Shell members 14, 15 are adapted to conventionally cover the padded members 11, 12. The shell members 14, 15 include door shell members 14 and fender shell members 15 which are removably attached to ends of the door shell members 14. The padded members 11, 12 and the shell members 14, 15 are contoured and adapted to the shapes of the doors 30 and fenders 31 of the vehicle 29. Each of the padded members 11, 12 and the shell members 14, 15 are tapered toward an end thereof.

A vehicle attachment assembly for attaching the padded members 11,12 and the shell members 14,15 to the vehicle 29 includes, as a first embodiment, length-adjustable elastic belts 16 each having fastening members 17,18 securely and conventionally attached at ends thereof and being detachably connected to one another, and also includes hook and loop fasteners 20 being conventionally disposed upon and along outer sides 19 of the length-adjustable elastic belts 16. The length-adjustable elastic belts 16 are adapted to fasten about doors 30 of a vehicle 29 with the hook and loop fasteners 20 being conventionally disposed on an outside of the vehicle 29 and facing away from the vehicle 29. The padded members 11,12 are attachable to the hook and loop fasteners 20. The vehicle attachment assembly also includes strips of hook and loop fasteners 24 having a ridged spine 34 and being conventionally attached along edges of the ends of the door padded members 11 and the fender padded members 12 to substantially secure the fender padded members 12 to the door padded members 12. Each of the length-adjustable elastic belts 16 includes a notch 22 being disposed in a bottom edge 21 thereof near one of the fastening members 17,18 and being adapted to receive a portion of the door 30, and also includes a rigid sleeve 23 being conventionally disposed thereupon near one of the fastening members 17,18. The vehicle attachment assembly also includes an elastic strap 25 having a hook member 26 securely and conventionally disposed at one end and a loop member 27 being securely and conventionally disposed at another end. The hook member 26 is adapted to hook about an edge of a door 30. The loop member 27 is adapted to receive one of the length-adjustable elastic belts 16 therethrough. The elastic strap 25 further having hook and loop fasteners 20 being securely and conventionally disposed upon and along an outer side thereof and being adapted to fasten to one of the door padded members 11.

As a second embodiment, the vehicle attachment assembly includes a plurality of suction cup members 28 being spaced about and being securely and conventionally attached to back sides 13 of the padded members 11,12 for attaching the padded members 11,12 to the doors 30 and fenders 31 of the vehicle 29. The vehicle attachment assembly further includes anti-theft strap members 33 being spaced apart and being attached to the padded members 11,12.

Figure 8:
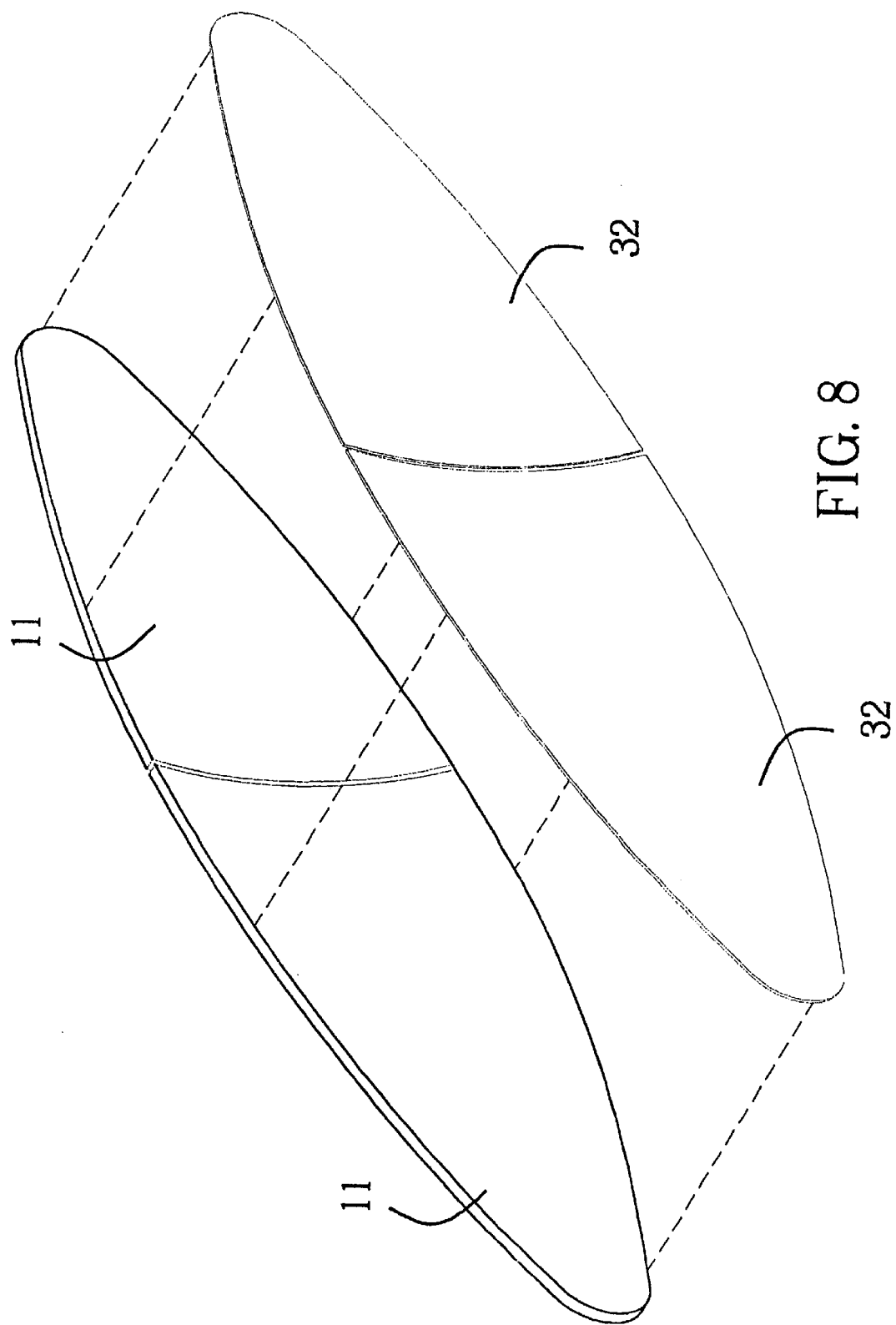
FIG. 8 is an exploded perspective view of the present invention.
Figure 10:
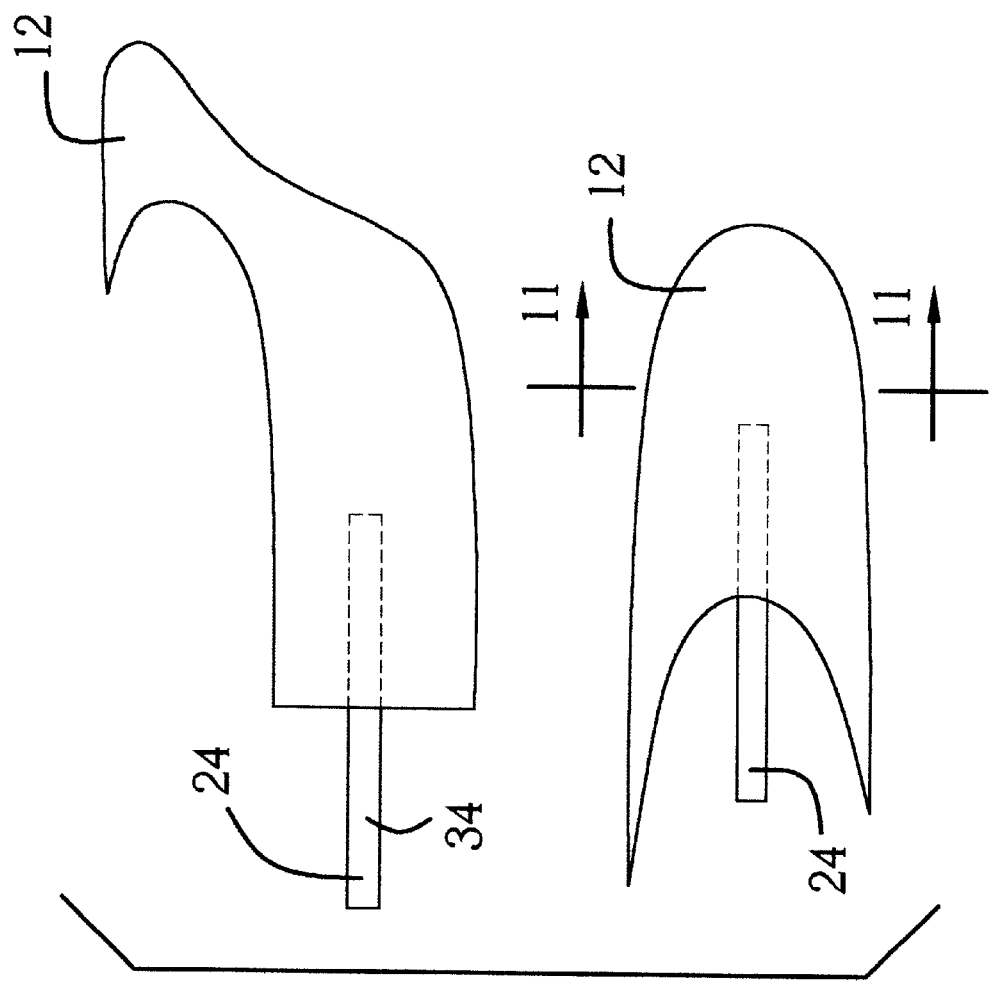
FIG. 10 are side elevational views of different embodiments of fender padded members of the present invention.
Figure 11:
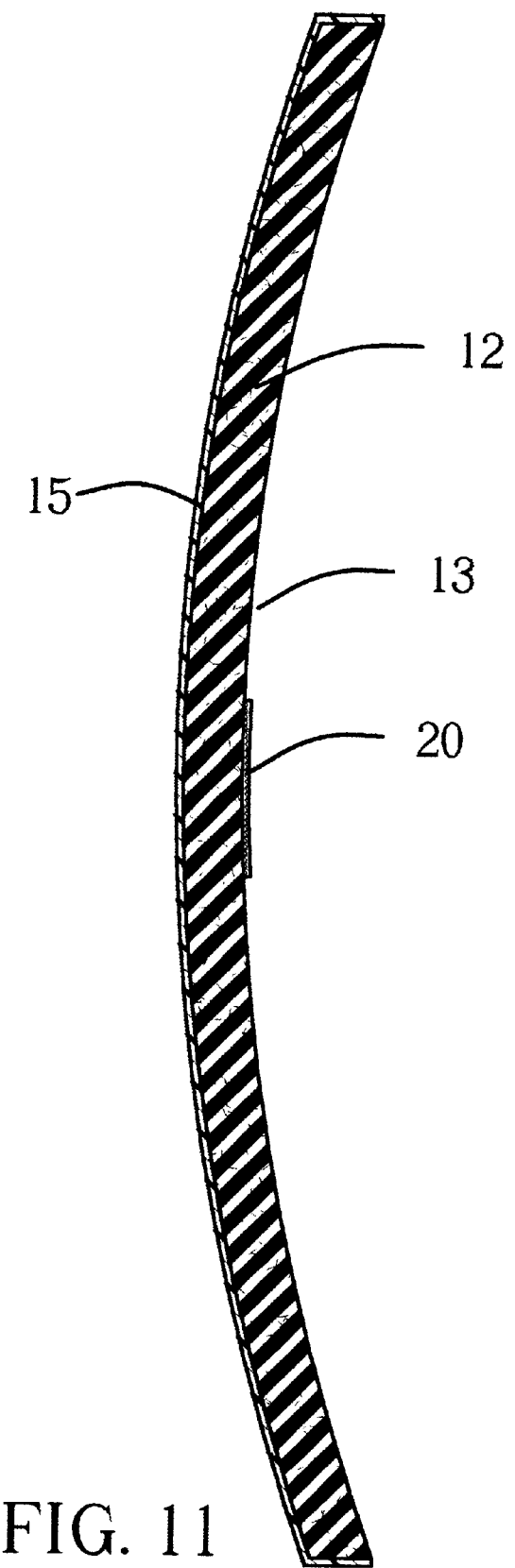
FIG. 11 is a schematic sectional view of the fender padded member and fender shell member taken along line 11—11 of FIG. 10.

As a third embodiment, the vehicle attachment assembly includes a magnetic sheet 32 being attached to the padded members 11 as shown in FIG. 8 and being attachable to the vehicle 29.

In use, the user fastens the elastic belts 16 horizontally about the doors 30 of the vehicle 29 and attaches the padded members 11,12 to the elastic belts 16 to protect the doors 30 and fenders 31 of the vehicle 29.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle door and fender protection assembly, comprising:
    a padded member for attaching to doors of a vehicle;
    a shell member adapted to cover said padded member; and
    a vehicle attachment assembly for attaching said padded member and said shell member to the vehicle;
    wherein said vehicle attachment assembly includes a length-adjustable elastic belt having fastening members securely attached at ends thereof and being detachably connected to one another, and also includes hook and loop fasteners being disposed upon and along an outer side of said length-adjustable elastic belt, said length-adjustable elastic belt being adapted to fasten about the doors of the vehicle with said hook and loop fasteners being disposed on an outside of the vehicle and facing away from the vehicle, said padded member being attachable to said hook and loop fasteners;
    wherein said vehicle attachment assembly also includes strips of hook and loop fasteners being attached along edges of said ends of said door padded member and said fender padded member.

2. A vehicle door and fender protection assembly as described in claim 1, wherein said padded member and said shell member are contoured and adapted to the shapes of the doors and fenders of the vehicle.

3. A vehicle door and fender protection assembly as described in claim 1, wherein said padded member and said shell member are tapered toward an end thereof.

4. A vehicle door and fender protection assembly as described in claim 1, wherein said length-adjustable elastic belt includes a notch disposed in a bottom edge thereof near one of said fastening members and being adapted to receive a portion of the door, and also includes a rigid sleeve being disposed thereupon near one of said fastening members.

5. A vehicle door and fender protection assembly, comprising:
    a padded member for attaching to doors of a vehicle;
    a shell member adapted to cover said padded member; and
    a vehicle attachment assembly for attaching said padded member and said shell member to the vehicle;
    wherein said vehicle attachment assembly includes a length-adjustable elastic belt having fastening members securely attached at ends thereof and being detachably connected to one another, and also includes hook and loop fasteners being disposed upon and along an outer side of said length-adjustable elastic belt, said length-adjustable elastic belt being adapted to fasten about the doors of the vehicle with said hook and loop fasteners being disposed on an outside of the vehicle and facing away from the vehicle, said padded member being attachable to said hook and loop fasteners;
    wherein said vehicle attachment assembly also includes an elastic strap having a hook member disposed at one end and a loop member being disposed at another end thereof, said hook member being adapted to hook about an edge of a door, said loop member being adapted to receive said length-adjustable elastic belt therethrough, said elastic strap further having hook and loop fasteners being disposed upon and along an outer side thereof and being adapted to fasten to said padded member.

6. A vehicle door and fender protection assembly as described in claim 5, wherein said padded member and said shell member are contoured and adapted to the shapes of the doors and fenders of the vehicle.

7. A vehicle door and fender protection assembly as described in claim 5, wherein said padded member and said shell member are tapered toward an end thereof.

8. A vehicle door and fender protection assembly as described in claim 5, wherein said length-adjustable elastic belt includes a notch disposed in a bottom edge thereof near one of said fastening members and being adapted to receive a portion of the door, and also includes a rigid sleeve being disposed thereupon near one of said fastening members.

9. A vehicle door and fender protection assembly, comprising:
    a padded member for attaching to doors of a vehicle;
    a shell member adapted to cover said padded member; and
    a vehicle attachment assembly for attaching said padded member and said shell member to the vehicle;
    wherein said vehicle attachment assembly includes a length-adjustable elastic belt having fastening members securely attached at ends thereof and being detachably connected to one another, and also includes hook and loop fasteners being disposed upon and along an outer side of said length-adjustable elastic belt, said length-adjustable elastic belt being adapted to fasten about the doors of the vehicle with said hook and loop fasteners being disposed on an outside of the vehicle and facing away from the vehicle, said padded member being attachable to said hook and loop fasteners;
    additionally comprising a fender padded member being attach to a fender of a vehicle, said fender padded member being removably attachable to an end of said padded member as an extension thereof.

10. A vehicle door and fender protection assembly as described in claim 9, wherein said vehicle attachment assembly includes a plurality of suction cup members being spaced about and being securely attached to back sides of said padded members for attaching said padded member to the doors and fenders of the vehicle, and further includes anti-theft strap members being attached to said padded member.

11. A vehicle door and fender protection assembly as described in claim 9, wherein said padded member and said shell member are contoured and adapted to the shapes of the doors and fenders of the vehicle.

12. A vehicle door and fender protection assembly as described in claim 9, wherein said padded member and said shell member are tapered toward an end thereof.

13. A vehicle door and fender protection assembly as described in claim 9, wherein said length-adjustable elastic belt includes a notch disposed in a bottom edge thereof near one of said fastening members and being adapted to receive a portion of the door, and also includes a rigid sleeve being disposed thereupon near one of said fastening members.

* * * * *